United States Patent [19]

Yamamura et al.

[11] Patent Number: 4,646,651

[45] Date of Patent: Mar. 3, 1987

[54] FLOATING APPARATUS FOR ATTRACTIVE MAGNETIC FLOATER

[75] Inventors: Sakae Yamamura, Tokyo; Hitoshi Yamaguchi, Kanagawa, both of Japan

[73] Assignees: Fuji Electric Corporate Research and Development Limited; Fuji Electric Company, Ltd., both of Kanagawa, Japan

[21] Appl. No.: 667,626

[22] Filed: Nov. 2, 1984

[30] Foreign Application Priority Data

Nov. 4, 1983 [JP] Japan ................................. 58-207095
Apr. 26, 1984 [JP] Japan ................................. 59-84899
Apr. 26, 1984 [JP] Japan ................................. 59-84900

[51] Int. Cl.$^4$ ............................................. B60L 13/04
[52] U.S. Cl. ................................... 104/281; 104/286; 104/290
[58] Field of Search ........................... 104/281–290, 104/292–294; 310/12, 13, 166

[56] References Cited

U.S. PATENT DOCUMENTS

| | | | |
|---|---|---|---|
| 3,470,828 | 10/1969 | Powell, Jr. et al. | 104/281 |
| 3,834,318 | 10/1974 | Fellows et al. | 104/284 |
| 3,850,108 | 11/1974 | Winkle | 104/290 |
| 3,882,789 | 5/1975 | Simon et al. | 104/281 |
| 3,885,504 | 5/1975 | Baermann | 104/283 |
| 3,895,585 | 7/1975 | Schwarzler | 104/281 |
| 4,273,054 | 6/1981 | Yamashita et al. | 104/281 |
| 4,408,139 | 10/1983 | Schwarzler | 104/290 |

FOREIGN PATENT DOCUMENTS 2436106  7/1974  Fed. Rep. of Germany ...... 104/282
77315    6/1977  Japan ................................. 104/290

OTHER PUBLICATIONS

German publication from BBC-Nachrichten magazine (1981).

Primary Examiner—Robert B. Reeves
Assistant Examiner—Dennis C. Rodgers
Attorney, Agent, or Firm—Finnegan, Henderson, Farabow, Garrett & Dunner

[57] ABSTRACT

A floating apparatus for use in an attractive floater railway includes a magnetic rail mounted on the underside of a track. The magnetic rail comprises sheets of ferromagnetic material laminated together and is formed to have a cross section in the shape of a trapezoid or a quadrant of a circle with faces of the rail including a horizontal surface and a vertical surface. A guiding electromagnet is disposed opposite to the vertical surface and a supporting electromagnet is disposed opposite to the horizontal surface. The electromagnets are mounted on a truck and are constructed such that the respective fluxes thereof flow in opposite directions in the magnetic rail. The magnetic rail may include a magnetic propulsion rail opposite to a linear inductor machine to provide both vertical support and horizontal propulsion to the truck.

3 Claims, 15 Drawing Figures

FLOATING APPARATUS FOR ATTRACTIVE MAGNETIC FLOATER

BACKGROUND OF THE INVENTION

1. Field of the Invention

This invention relates to a floating apparatus for an attractive magnetic floater, which is adapted to support a vehicle by magnetic attractive forces acting between a magnetic rail made of ferromagnetic material, such as iron, on a track and an electromagnet mounted on the vehicle and to guide the latter to its left or right whereby the vehicle may be supported and led in a non-contacting manner. More particularly, this invention relates to a magnetic floating apparatus for an attractive magnetic floater railway, which is adapted to support, guide, and propel the vehicle in a non-contacting manner by electromagnetic force and electromagnetic propulsion acting between an electromagnet, an armature of a linear inductor machine (hereinafter referred to as "LIM") on the vehicle, and a secondary conductor and a secondary iron core of the LIM.

2. Description of the Prior Art

Figure 1:
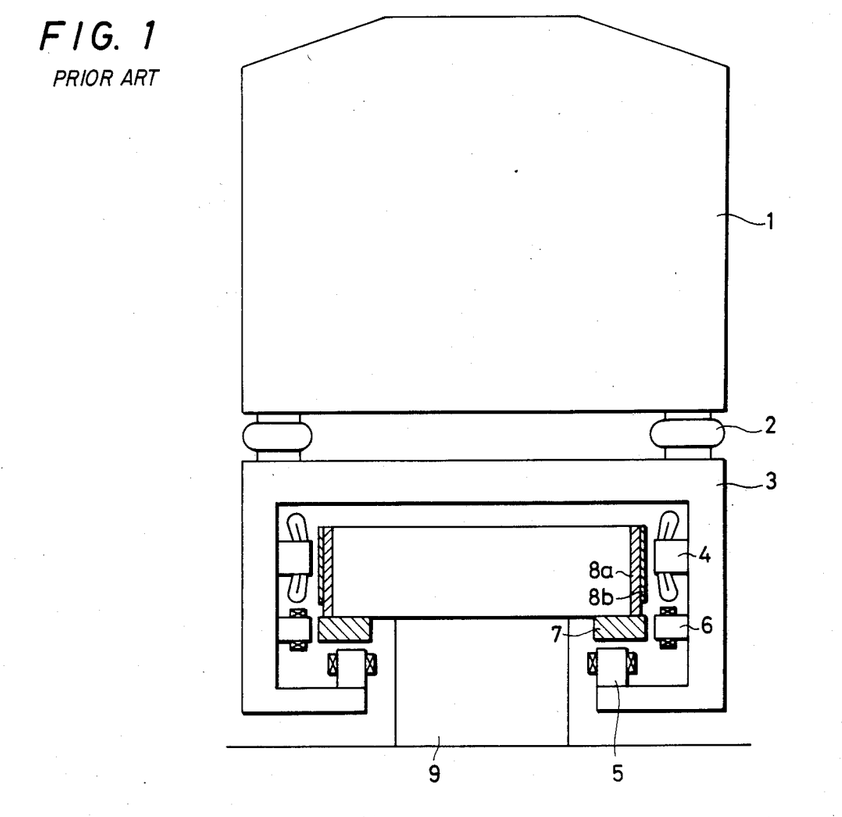
FIG. 1 is a sectional view of conventional magnetic floater.

FIG. 1 is a sectional view showing one construction of a magnetic floater of this class, wherein a chassis 1 is mounted by spring means 2 on a truck 3 which is provided with a linear induction motor armature 4 for propelling the vehicle, vehicle supporting electromagnets 5, and vehicle guiding electromagnets 6. A secondary iron core 8a and a secondary conductor 8b are mounted bilaterally of a track 9 to oppose the induction motor armature 4. Magnetic rails 7 for support and guidance are mounted bilaterally on the lower surface of an upper portion of the track 9. The supporting electromagnets 5 are opposite the undersides of the rails 7 and the guiding electromagnets 6 are located on either side thereof.

In a vehicle formed in this manner, the exciting current of the supporting and guiding electromagnets 5 and 6 is controlled to provide an attractive force acting between the magnetic rails 7 and the supporting and guiding electromagnets 5 and 6 to float the truck 3 over the track 9 and to guide the truck 3 to the left or right. This controls a current flowing in the linear induction motor armature 4 so that the vehicle is propelled over the track 9 by an electromagnetic force acting between the armature 4 and the secondary conductor 8b.

In a floating apparatus of this class, it is desired that the apparatus be compact and lightweight with low power consumption, sufficient electromagnetic force, and an electromagnetic spring constant. In addition the apparatus must easily follow the track and have low costs for construction and operation.

This requires that the magnetic rails be low in construction and maintenance costs and have low eddy current loss. A technique wherein the supporting and guiding electromagnets, as shown in FIG. 1, are arranged to place the N and S poles alternately in the direction of advancement to form a salient pole, minimizes leakage flux of the electromagnets and renders the latter lightweight to exhibit little inductance and excellent following of the track.

Figure 2:
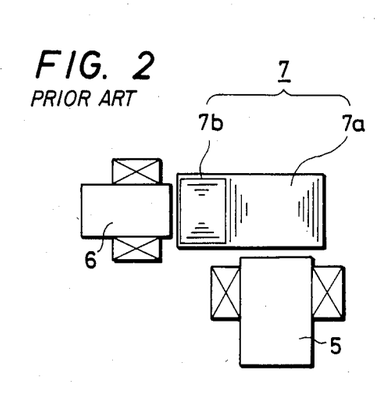
FIGS. 2 and 3 are sectional views of main parts of conventional floating devices.

FIG. 2 shows one form of a floating apparatus according to the conventional technique wherein support and guiding magnetic rails 7a, 7b and sheet panel ferromagnetic materials are laminated in different directions to integrate and combine them for reducing eddy current loss and to form the magnetic rail 7 for support and guidance.

Figure 3:
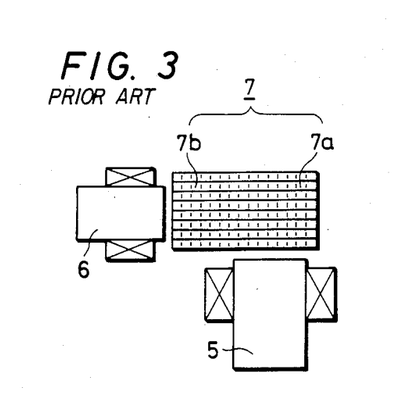

FIG. 3 shows another construction of a floating apparatus according to the conventional technique wherein the magnetic rail 7 is for support and guidance and the supporting and guiding rails 7a, 7b are bunched together while wire rods of ferromagnetic material are unified in an insulated condition so that eddy current loss occurring in the magnetic rail 7 is reduced against a magnetic field derived from the supporting magnets 5 and 6.

If the vehicle is run at a low speed, eddy current loss occurring in the magnetic rail 7 is so small that the magnetic rail is not required to be formed with a laminated structure and wire rods.

No consideration has been given, however, to flux distribution among the magnetic rails so that the sectional area of the magnetic rails 7 is simply the arithmetic addition of the supporting and guiding magnetic rails 7a, 7b and does not vary unless it is used with another element. This causes difficulty in reducing the cost of the magnetic rail.

If the magnetic rails 7 are formed with a laminated structure, two different structures of the magnetic rails must be used for floating and guiding the vehicle. The different directions of lamination give rise to defects and increase manufacturing cost. If the magnetic rails 7 are integrally formed of wire rods, a high degree of quality control is necessary because integration of the wire rods relies entirely on bonding. Also, insulation must be provided between the wire rods of ferromagnetic material to increase magnetic reluctance in a sectional direction. This causes an increase in power consumption for floatation because the exciting current of the electromagnet must be large.

OBJECTS AND SUMMARY OF THE INVENTION

In view of this background an object of the present invention is to provide an inexpensive composite magnetic rail for support, guidance, and propulsion.

Another object of the present invention is to provide a composite magnetic rail that is simple in construction and has low magnetic reluctance.

Still another object of the present invention is to provide a floating propulsion apparatus that uses the attractive force of the LIM as a supporting force to reduce energy consumption.

These and other objects are attained by a floating apparatus for use in an attractive floater railway wherein a vehicle mounted on a truck is adapted to float with respect to a train track as the truck moves in an advancing direction along the train track. The floating apparatus comprises a magnetic rail connected to the train track, extending in the advancing direction, having a bottom surface, and a side surface and including a plurality of first magnetic elements having a first magnetic polarity and a plurality of second magnetic elements having a second magnetic polarity opposite to the first polarity. The first magnetic elements and second magnetic elements are alternately provided in the advancing direction and a supporting electromagnet is mounted on the truck to be closely spaced to the bottom surface of the magnetic rail and to have a plurality of first poles disposed in the advancing direction and separated by a selected pole pitch. A guidance electromagnet is mounted on the truck to be closely spaced to the side surface of the magnetic rail and to have a plurality of second poles disposed in the advancing direction and separated by the selected pole pitch. Each one of the first poles corresponds to a different one of the second poles, has a magnetic polarity opposite to the corresponding second pole, and is symmetrically disposed with the corresponding second pole respective to the magnetic rail.

BRIEF DESCRIPTION OF THE DRAWINGS

The manner in which the objects, features, and advantages of the present invention are attained will be apparent from the following detailed description when considered in view of the drawings, wherein.

DETAILED DESCRIPTION OF THE PREFERRED EMBODIMENT

The present invention is constituted so that magnetic rails for support and guidance are mounted on a track along the direction of advancement. Supporting and guiding salient type electromagnets, having pole pitches that are equal to each other, are symmetrically disposed bilaterally of the vehicle in such a manner that the magnetic pole of a supporting electromagnet is opposed to the underside of each of the magnetic rails while the magnetic pole of a guiding electromagnet is opposed to the side of each of the magnetic rails. The N and S poles are alternately provided along the direction of advancement and the supporting and guiding electromagnets are arranged so that the centers of the magnetic poles are aligned with each other. The polarities of the electromagnets are opposite in order to negate the generation of a longitudinal flux component in the magnetic rails.

According to the present invention, a laminated structure of a stacked iron core, which provides a low flux component, includes means to interlock the laminated surface of the stacked iron core. The major portion of the flux along the laminated surface, in the presence of the flux generated in the supporting and guiding electromagnets secured to the vehicle so as to change the directions of the magnetic poles by 90° C., passes through the magnetic rails for support and guidance.

More specifically, sheets of ferromagnetic material, in widths slightly different from each other, are bonded to each other to form the stacked iron core. The sectional configuration of the stacked iron core, perpendicular to the direction of the vehicle advancement, is trapezoidal and includes a virtual vertical angle that is right-angled or a substantially quarter circle, viz., a segmental configuration. Each of the sheets of ferromagnetic materials is designed so that one end widthwise of the stacked iron core is mounted on an abutment formed in the track to render the one end horizontal. One end widthwise of the sheet ferromagnetic materials is disposed on the supporting electromagnet and its other end is located on the guiding electromagnet to oppose each other. As a result, the flux generated in both the electromagnets is synthesized in the ferromagnetic materials to flow through the magnetic rails along the laminated surface of the stacked iron core to reduce the flux component in the direction of lamination, thereby minimizing the sectional area without increasing magnetic reluctance and eddy current loss.

The magnetic floating apparatus of the present invention is fabricated so that the magnetic rails for support and guidance (hereinafter referred to as the "double purported rail means") are formed with a stacked iron core with a trapezoidal cross section in which the oblique sides intersect at right angles. A propulsion rail means composed of a laminated element formed of a secondary iron core and a secondary conductor of a linear induction machine is arranged to have the secondary iron core bonded to the base on the narrow side of the double purported rail means. This provides an integrated composite magnetic rail for support, guidance, and propulsion.

The composite magnetic rail is fixed to a slanted abutment formed at a lower corner of the track so that one slope of the trapezoid of the rail may be downwardly directed and the other slope may be oriented sideways. With this arrangement, sheet ferromagnetic materials which form the double purported magnetic rail means include end surfaces wherein one is positioned on the underside and the other one is on the side facing the poles of the supporting and guiding electromagnets to improve magnetic characteristics. At the same time, an armature of the LIM is disposed to face the surface of a slanted and downward secondary conductor to use the attractive force of the LIM as support.

EXAMPLE 1

Figure 4:
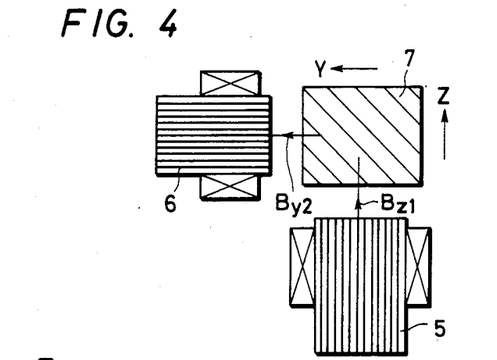
FIGS. 4 and 5 are respectively a sectional view and a side view of an embodiment of the present invention.
Figure 5:
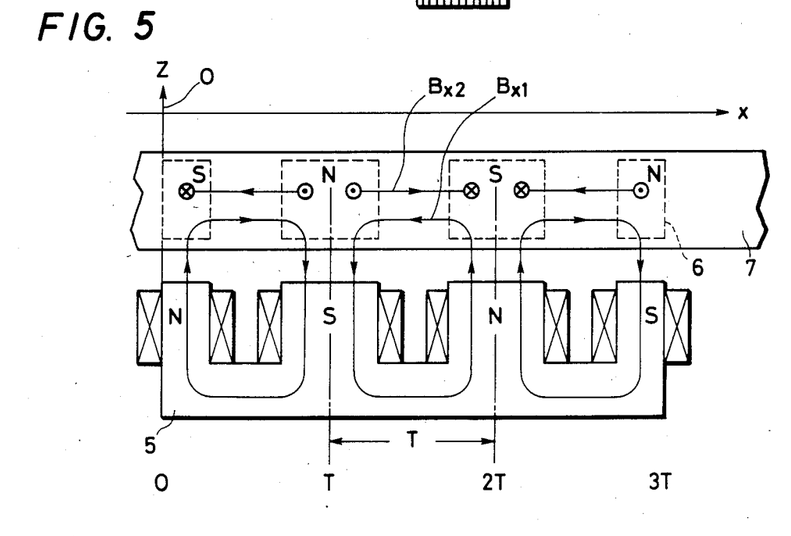

As shown in FIGS. 4 and 5, a magnetic rail 7 used for support and guidance is mounted bilaterally of a track (not shown) along the length thereof. Salient supporting and guiding electromagnets 5, 6 are mounted bilaterally and longitudinally of the vehicle so as to alternate magnetic poles in a manner that is symmetrical left and right. The polar pitches of the supporting and guiding electromagnets 5, 6 are equal to each other, and the supporting and guiding electromagnets 5, 6 are disposed on a truck 3 in such a manner that one electromagnet is below the magnetic rail 7 and the other electromagnetic faces the side of the magnetic rail 7. The centers of the respective magnetic poles are aligned with the supporting and guiding electromagnets 5, 6 with respect to the longitudinal direction of the vehicle. With this disposition, the guiding and supporting electromagnets 5, 6, arranged in parallel with the longitudinal direction of the vehicle, are excited to render the polarities thereof opposite.

Under the aforementioned circumstances, the flux flows as shown in FIG. 5. The flux component $B_{x1}$ of the supporting electromagnet 5 in the direction (x direction) of advancement along the magnetic rail 7 and the flux component $B_{x2}$ of the guiding electromagnet 6 are mutually negated.

Figure 6:
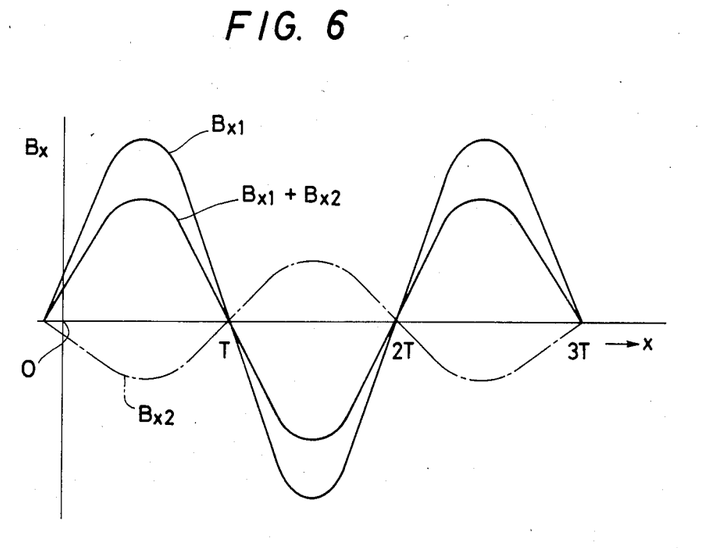
FIGS. 6 and 7 are graphs which illustrate the distribution of fluxes passing through a magnetic rail in the advancing direction in the embodiment of FIGS. 4 and 5.

FIG. 6 is a graph showing distribution in the magnetic rail of the flux components $B_{x1}$ and $B_{x2}$ along the direction of advancement. The left ended positions of the magnetic poles 5, 6 are considered to be the origin, O, with the direction (x direction) of advancement as the abscissa. The flux component, $B_x$, in the direction of advancement is the ordinate. Characters O, T, 2T, and 3T on the abscissa in the graph correspond to the center positions of the N and S poles in the direction of advancement.

As is apparent from the drawing, the flux component in the direction of advancement, passing through the magnetic rail 7, is minimum at the center positions of the respective magnetic poles and maximum between the N and S poles. The flux components $B_{x1}$ and $B_{x2}$ of the supporting and guiding electromagnets, however, are of opposite polarities so that the sum of them is less than the flux component $B_{x1}$ of the supporting electromagnet. For this reason, the cross-sectional area of the magnetic rail 7 may be established by taking flux into account, and may be reduced to a size such that the flux density is within the saturated limit of the ferromagnetic material which forms the magnetic rail 7. The guiding magnet 6 is not always excited so that the sectional area of the magnetic rail 7 is determined based on the flux component $B_{x1}$ in the direction of advancement of the supporting electromagnet.

Figure 7:
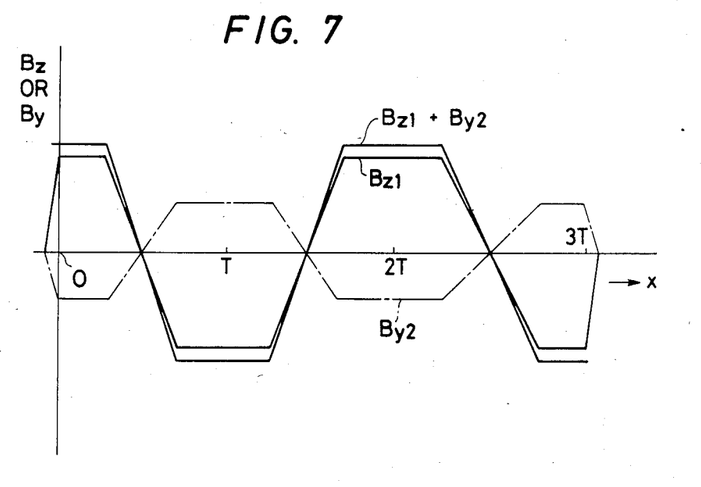

FIG. 7 graphically illustrates the distribution flux component perpendicular to the direction of advancement. As shown, the flux component, $B_{z1}$, of the supporting electromagnet 5 and the flux component, $B_{y2}$, of the guiding electromagnet 6 are reversed with respect to each other because the magnetic poles are excited to render opposite polarities.

The electromagnets 5, 6 are, however, disposed at right angles so that the fluxes of the magnetic components do not fully negate each other. The sum of $B_{z1}$ and $B_{y2}$ equals $B_{z1}$ or is somewhat larger than the latter. The magnetic flux entering the magnetic rail 7 in a direction perpendicular to the direction of advancement, whose portions are in opposition to the S and N poles, is turned to the direction of advancement so that the flux density in the cross-sectional direction perpendicular to the direction of advancement of the magnetic rail 7 is not above the saturation limit of the ferromagnetic material forming the magnetic rail 7. The flux density in the spaces between the electromagnets 5, 6 and the magnetic rail 7 is also less than the saturated flux density of the ferromagnetic material. Thus, the magnetic field component perpendicular to the direction of advancement is considerably smaller than the saturated value of the ferromagnetic material. Accordingly, if the supporting magnetic rail 7a shown in FIG. 2 is available for use with the guiding magnetic rail 7b, the cross-sectional area of the magnetic rail 7 for support and guidance need not be larger than the cross-sectional area of the supporting magnetic rail 7a. In other words, the cross-sectional area of the magnetic rail 7 required for supporting may also be available for use in guidance when the present invention is employed. Thus, no cost is incurred for providing the guiding magnetic rail.

In order to improve left and right guidance with an immaterial displacement, a control is made so that a specific mean current is normally applied to the bilaterally-dispersed guiding electromagnets 6 to increase the effect of reducing the magnetomotive force required for the portions of the magnetic rail 7 while increasing excitation power for the supporting electromagnet.

Figure 8:
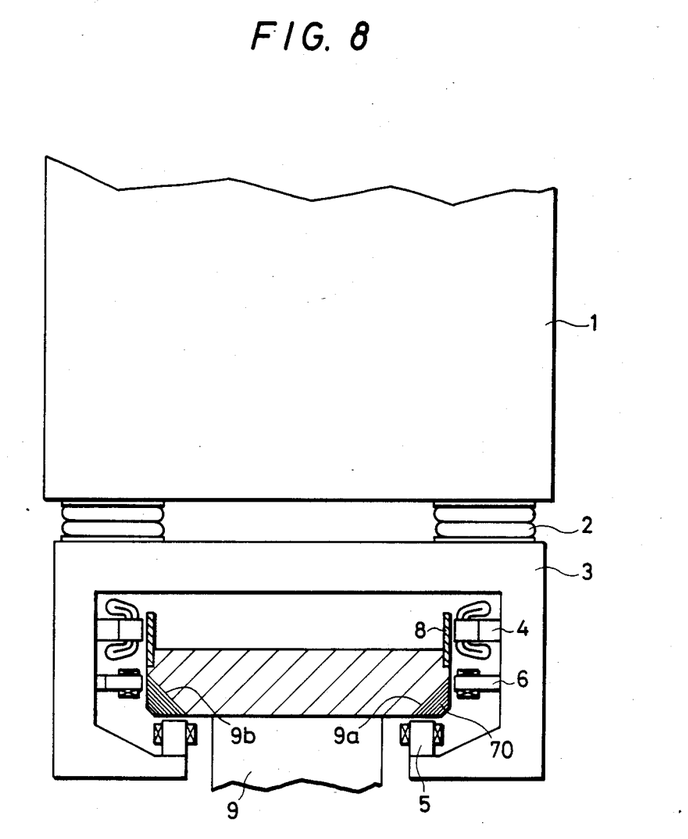
FIG. 8 is a structural view of a magnetic floating according to the present invention.

FIG. 8 is a schematic representation of an attractive magnetic floating apparatus embodying the present invention. The magnetic rails 70 are mounted bilaterally of the track 9 to run along the direction of advancement. The N and S poles are successively arranged along the longitudinal direction of the vehicle bilaterally thereof. Salient pole type supporting and guiding electromagnets 5, 6 are symmetrically disposed left and right. The supporting and guiding electromagnets 5, 6 are arranged on the truck 3 in such a manner that one magnetic pole of the supporting electromagnet faces the underside of one magnetic rail 70 and one magnetic pole of the guiding electromagnet 6 faces the side of one magnetic pole of the same magnetic rail 70.

Each of the magnetic rails 70 is formed of mutually bonded sheet ferromagnetic material, such as iron, to define a stacked iron core. The stacked iron core may have a trapezoidal configuration as shown in which a vertical angle of a triangle circumscribed about the trapezoid is a right angle. The magnetic rails are mounted to have the bases of the trapezoids adhered to abutment surfaces 9a, 9b at an angle of, for example, 45° at the left and right corners of the track 9. In this manner, each of the magnetic rails 70 is adapted to have its underside face the supporting electromagnet 5 and its side face the guiding electromagnet 6. Thus, the opposite ends widthwise of the sheet ferromagnetic material are positioned on the underside and side of each of the magnetic rails. The laminated surfaces of the sheet ferromagnetic material are in communication with the underside and side to allow magnetic flux generated in the supporting and guiding electromagnets 5, 6 to pass through each magnetic rail and to run along the laminated surfaces thereof via the opposite ends of the sheet ferromagnetic material. Little flux component therefore passes through the sheet ferromagnetic material so that eddy current loss is reduced without increasing the magnetic reluctance derived from flux passage through the laminated surfaces, as in the prior art structure.

Figure 9:
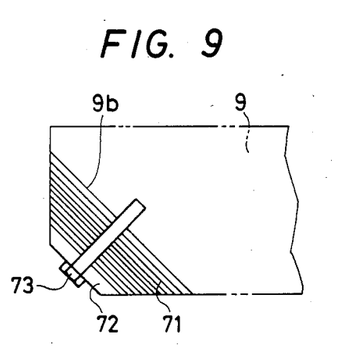
FIG. 9 is a sectional view of a magnetic rail used in the floater of FIG. 8.

FIG. 9 is a detailed view of the magnetic rail in the embodiment shown in FIG. 8. A stacked iron core is formed by mutually bonding trapezoidal sheets of ferromagnetic material to each other, compressing the stack of sheets, and securing the sheets in the direction of lamination by mounting members such as a bolt 73. The bolt 73 passes through the stacked iron core in the direction of lamination over a retainer plate 72 so as to closely adhere to the abutment surface 9b of the track on which the widest sheet ferromagnetic material is mounted. The magnetic rail may be more firmly mounted on the track by adhesive contact bonding to the surface of the abutment surface 9a.

A stacked iron core 71 may be formed by mutually bonding the sheet ferromagnetic materials in different widths into a trapezoidal configuration or by cutting a planar iron core into a trapezoidal configuration. At any rate, the number of required steps for producing the magnetic rail is greatly reduced and the cost lowered in comparison with a conventional magnetic rail formed by bonding wire rods to each other.

Figure 10:
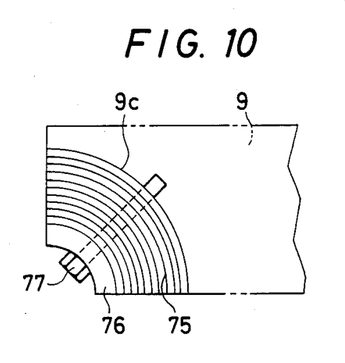
FIG. 10 is a sectional view of another embodiment of a magnetic rail according to the present invention.

FIG. 10 is a sectional view showing an alternate embodiment of the magnetic rail 9. A stacked iron core 75 is formed into a segment in a substantially quarter circle and is pressurized and held to an abutment surface 9c formed in the track 9 by mounting members 77, such as bolts, and by a curved retainer plate 76 so that the outer peripheral surface of the stacked iron core closely contacts the track. The laminated surfaces of the sheet ferromagnetic material are adapted to arrange the ends thereof in parallel with the direction of magnetic flux generated by the supporting and guiding electromagnets 5, 6 to improve the flow of magnetic flux over that in the embodiment shown in FIG. 9. The stacked core 75 may be readily manufactured into a cylinder by winding adhesive-coated, sheet ferromagnetic materials and then cutting the cylinder into quarter circle segments.

Figure 11:
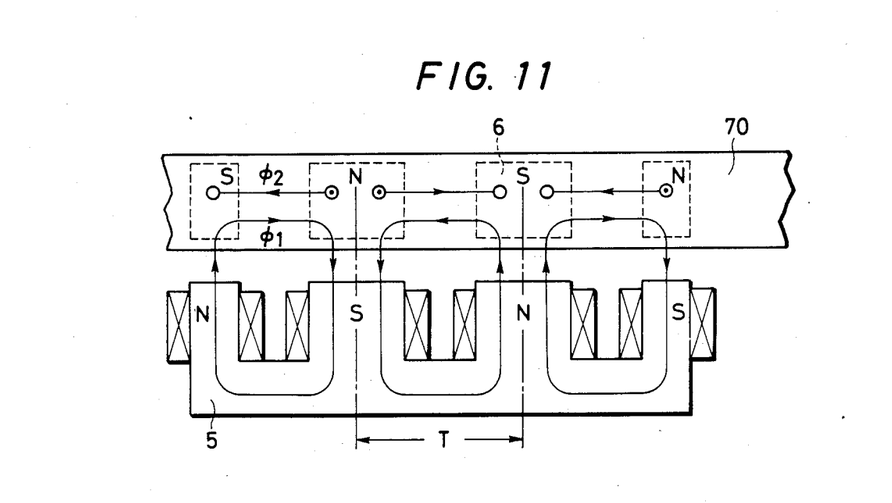
FIG. 11 is a diagram illustrating the flow of magnetic flux in the embodiment of FIGS. 9 and 10.

FIG. 11 is a view explanatory of the flow of magnetic flux illustrated in the embodiment of FIG. 10, wherein the supporting electromagnet 5 is mounted on the vehicle and is opposed to the underside of the magnetic rail 70. Although the supporting electromagnet 5 may move left and right, the N and S poles are alternatively provided at a pitch, T, in the direction of advancement of the vehicle.

The guiding electromagnet 6 is mounted in alignment with the center position of the magnetic pole of the supporting electromagnet 5, as shown by the broken lines in the drawing. The poles of the supporting and guiding electromagnets 5, 6, whose center positions are in alignment with each other, are adapted to have opposite polarities. In this manner, the magnetic flux $\phi_1$, generated in the supporting electromagnet 5, and the magnetic flux $\phi_2$, generated in the guiding electromagnet 6, are distributed within the magnetic rail 70 in directions opposite to each other as shown. The fluxes which enter from the underside and the side of the magnetic rail 70 and into the common sheet ferromagnetic materials are readily negated therein to reduce the level of flux in the magnetic rail 70.

As a result of this structure, the cross-sectional area of the magnetic rail 70 may be reduced when compared with that of the magnetic rail 7 of the prior art structure of FIG. 1. Moreover, the cross-sectional area of the magnetic rail 70 may be less than that of the magnetic rail 7 for support and guidance shown in FIG. 2. For this reason, each of the sheet ferromagnetic materials is formed as the common magnetic path in communication with the supporting electromagnet 5, positioned underneath the guiding electromagnet 6 positioned to one side.

EXAMPLE 2

Figure 12:
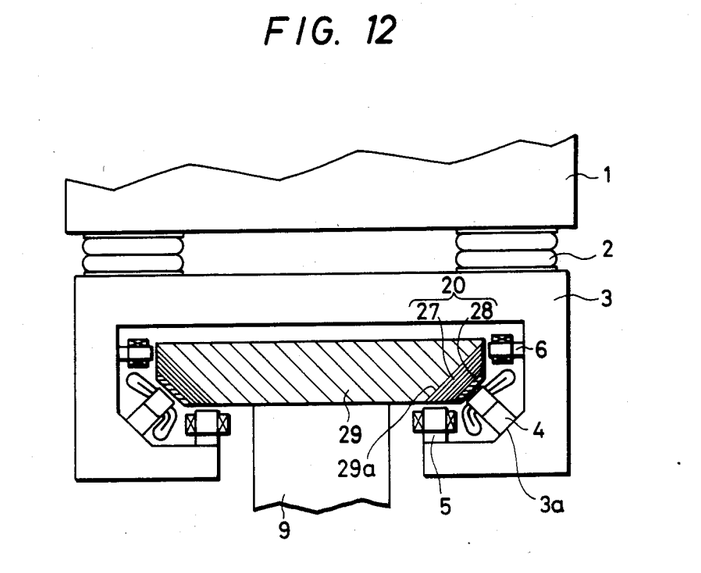
FIG. 12 is a structural view illustrating another embodiment of the present invention.

FIG. 12 is a structural view showing a magnetic floating apparatus forming a third embodiment of the present invention. A magnetic rail portion 27 for support and guidance comprises a stacked iron core that is trapezoidal in cross section. A propulsion magnetic rail 28 comprises a laminated element wherein the secondary conductor and the iron core are adhered to each other and form an integrated magnetic rail 20 which has a substantially trapezoidal configuration. The magnetic rail 20 is secured by mounting members such as a bolt, to one of the abutment surfaces 29a that slope downwardly on each side of the track 29.

In this instance as shown, the composite magnetic rail 20 has a cross section in the shape of an isosceles trapezoid with an angle of 90° formed by a pair of oblique sides with each of the abutment surfaces 29a being inclined at an angle of 45°. The supporting electromagnet 5 and the guiding electromagnet 6 are disposed on the truck 3 opposite to the underside and the side of the magnetic rail 20, respectively so that flux generated in the electromagnets 5, 6 enters from the ends of the sheet ferromagnetic materials into the magnetic rail 20 and flows between the N and S poles arranged along the laminated surfaces and in the direction of advancement of the vehicle. This reduces the flux component passing through the laminated surfaces so that the magnetic rail 20 for support and guidance has low magnetic reluctance and eddy current loss.

On the other hand, since the surface of the propulsion magnetic rail portion 28 slopes downwardly at an angle of 45°, the armature 4 of the LIM is fixed to the inclined abutment surface 3a of the truck 3. The magnetic attractive force of the LIM may also be used to support the truck 3. This reduces energy consumption for support.

It is not necessary for the composite magnetic rail 20 to have a cross section in the shape of an isosceles trapezoid and it may be formed in some other configuration to have a horizontal underside and vertical sides conforming to the angle of inclination of the abutment surfaces 29a.

Figure 13:
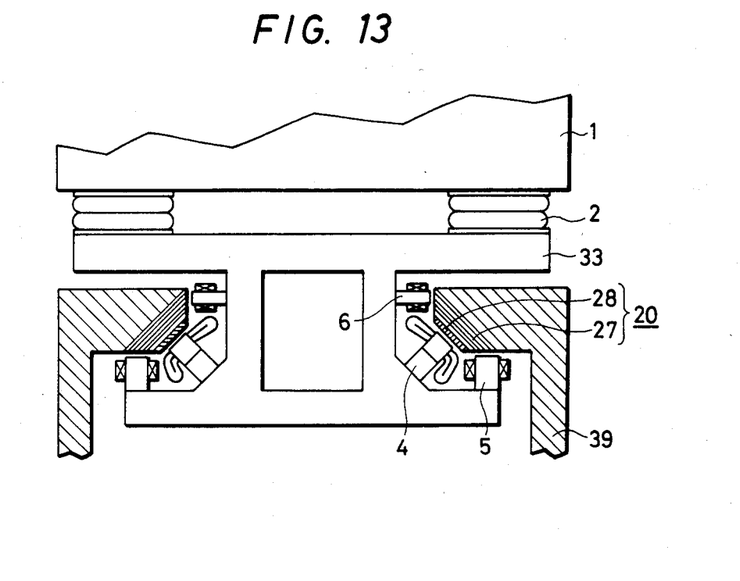
FIG. 13 is a structural view illustrating a modification of the embodiment of FIG. 12.

FIG. 13 illustrates a modified form of the embodiment of FIG. 12. The embodiment shown in FIG. 13 is substantially the same as the embodiment of FIG. 12 with the exception that the truck 33 is disposed between parallel tracks 39. The disposition of the components may be readily attained by substituting the laterally disposed components shown in FIG. 12 for those shown in FIG. 13.

Figure 14:
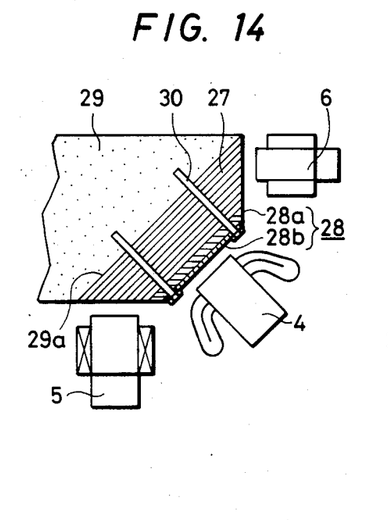
FIG. 14 is a sectional view of a composite magnetic rail in the embodiment of FIG. 13.

FIG. 14 is a section of the composite magnetic rail 27 forming the embodiment in FIGS. 12 and 13, wherein the magnetic rail 27 for support and guidance is of the so-called bonded iron core type in which a stacked iron core formed of sheet magnetic materials, such as a silicon steel plate and an iron plate, is impregnated with resin or firmly attached by adhesive. The magnetic rail 27 has a trapezoidal configuration with its underside being opposed to the supporting electromagnet 5 and the side opposite to the guiding electromagnet 6 being perpendicular to the underside.

The propulsion magnetic rail 28 is mounted closely adjacent to one surface in the direction of lamination and comprises a laminated element consisting of the secondary iron core 28a of the LIM formed of sheet ferromagnetic material, such as a thick iron plate, and a secondary conductor 28b of the LIM formed of aluminium or the like. This rail is fixed, for instance, by mounting bolts 30 to the abutment surfaces that are downwardly inclined at opposite ends widthwise of the track 29. Each of the mounting bolts are preferably coated with an insulator to prevent a short-circuit. If the mounting bolts 30 are positioned as shown to protrude outwardly of the surface opposite to the LIM armature 4, the projecting portions will not influence the gap length between the armature 4 and the secondary conductor 28b.

The magnetic rail portion 27 for support and guidance may be obtained by cutting a prefabricated laminated plate into a trapezoidal shape or by laminating sheet ferromagnetic materials in different widths to form a trapezoidal shape. The magnetic floating apparatus manufactured in this manner provides the magnetic rail 20 for support and guidance which is capable of reducing eddy current loss and energy consumption.

The magnetic flux generated by the LIM armature 4 passes through the secondary conductor 28b to flow through the secondary iron core 28a and back to the armature 4, to produce propulsion and supporting forces.

Thus, the attractive force, which has previously not been used, contributes to supporting the vehicle. The secondary iron core 28a of the LIM may be formed by sheet ferromagnetic materials, such as a thick iron plate, with high mechanical strength. The composite magnetic rail 20 may be rigidly mounted by a mounting member, such as a through bolt, on the track so that the apparatus is provided with higher reliability than the conventional structure whose mechanical strength relies on bonding or adhesion since the secondary iron core 28a functions as a mechanical reinforcing plate.

Figure 15:
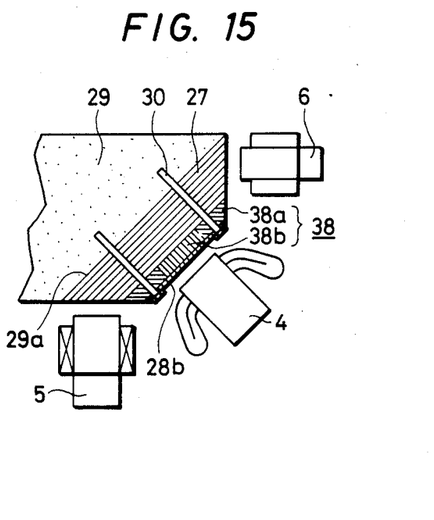
FIG. 15 is a sectional view of a composite magnetic rail of another embodiment of the present invention.

FIG. 15 is a sectional view of a composite magnetic rail with a structure that is different from FIG. 14. The secondary iron core 38 of the LIM includes a stacked iron core having end portions 38a with excellent magnetic properties and a central portion 38b made of sheet iron and having a high mechanical strength. With this construction, the eddy current loss in the secondary iron core is reduced.

The stacked iron core end portions 38a are formed by laminating sheets of ferromagnetic material, such as silicon steel, iron, or the like, in the vertical direction and against the laminating direction of the magnetic rails 27 for support and guidance. The sheets of ferromagnetic materials in the end portions 38a may be bonded by an impregnated resin, an adhesive, or the like. The stacked iron core end portions 38a reduce eddy current loss by the laminating effect because the magnetic flux generated in the armature 4 flows through the secondary conductor 28b in the advancing direction within the secondary iron core and along the surface of the lamination. Also, a composite magnetic rail having a high mechanical reliability can be obtained because the central, sheet iron portion 38b works as a reinforcement material.

With the embodiments of the present invention, the cost of a track portion can be reduced by reducing the size of a magnetic rail for guidance used in cooperation with a floating apparatus comprising an attractive magnetic floater having a salient supporting electromagnet and salient guiding electromagnet. The electromagnets have an equal pole pitch and the centers of the magnetic poles of the supporting and the guiding electromagnets are aligned with each other. The polarities of aligned magnetic poles in the electromagnets are, however, reversed.

With this construction, the sectional area of the magnetic rail may be reduced, the size of the floating apparatus on the floater portion can also be reduced, and the truck can be made lightweight, inexpensive, and follow the track to an improved degree. As a result, the comfort and stability of a carriage mounted on a truck incorporating the present invention will be improved.

According to the present invention, the magnetic rail of the attractive magnetic floater is made of a stacked iron core in the form of a trapezoid having a virtual vertex angle of 90° or a sector of a quarter circle. The opposite end faces of the magnetic rail in the width direction of the sheet ferromagnetic materials which form the stacked iron core comprise the underside and one side of the magnetic rail which are opposed to the supporting electromagnet and the guiding electromagnet, respectively. The magnetic flux generated in the supporting electromagnet and the guiding electromagnet pass through the common sheet ferromagnetic materials along the laminating surfaces by way of the opposite end faces of the sheet ferromagnetic materials and do not pass through the laminating surfaces compared to the conventional structure. Consequently, the magnetic resistance is low, the flux component passing through the sheet ferromagnetic materials in the direction of thickness is small, and little eddy current loss occurs.

The sheet ferromagnetic materials are mutually adhered to form a trapezoidal or sectoral stacked iron core with the largest surface area portion of the stacked iron core being closely adhered to the engaging part of the track and secured to the track under pressure by using bolts which extend through the stacked iron core in the laminating direction. Consequently, the magnetic rail of this structure has a higher mechanical strength than that of conventional structures in which linear materials are merely adhered, and is easily and inexpensively prepared and provided.

Moreover, if the polarities of the supporting and guiding electromagnets are rendered opposite to each other so that the flux generated in the electromagnets passes through the magnetic rail mutually in the reverse direction, the total amount of flux passing through the magnetic rail is reduced. As a result, a separate guiding magnetic rail becomes unnecessary and the sectional area of the magnetic rail can be further reduced. Therefore, the magnetic floater and magnetic rail for support and guidance will be light and inexpensive, and will consume less electric power.

The magnetic rail for support and guidance is formed in a laminated structure and a propulsion magnetic rail portion comprising a laminate of a secondary iron core and a secondary conductor of a linear inductor machine is located closely adjacent one side thereof in the direction of lamination. A composite magnetic rail for support, guidance, and propulsion can be provided which has a trapezoidal cross section, wherein the angle made by a pair of oblique sides is a right angle and wherein the rail is mounted on engaging portions provided on both sides of the track so that one of a pair of oblique sides will be horizontal and the other will be vertical. As a result thereof, an integral composite magnetic rail for support, guidance, and propulsion can be provided in the first place, and expenses for the construction of the rail, the laying of the magnetic rail, maintenance and the like can be reduced. Also, the magnetic rail for support and guidance reduces eddy current loss and magnetic resistance and saves electric power that would normally be consumed for support and guidance. This is because the underside opposed to the supporting electromagnet and the side opposed to the guiding electromagnet are the end faces of a common sheet of ferromagnetic material. Magnetic flux generated in both electromagnets pass through the magnetic rail portion along the laminated surfaces of the common sheet ferromagnetic materials, and a flux component interlinked with the laminated surfaces is reduced as compared with that in the conventional structure. Moreover, electric power for exciting the supporting electromagnet can be saved, because the attracting power of a linear inductor machine can be used for supporting vehicles by mounting an armature of a linear inductor machine opposite to the magnetic rail portion for propulsion. At the same time, a magnetic rail having high reliability, as compared with that of the conventional structure depending on the strength of the adhering portion, can be provided because a secondary iron core of a linear inductor machine functions as a reinforcement material of a composite magnetic rail by constructing the secondary iron core with use of a thick sheet of iron.

It should be understood that the present invention is not limited to the particular embodiments described but is subject to other possible modifications, alterations, and equivalent arrangements within the scope of the appended claims.

What is claimed is:

1. A floating apparatus for use in an attractive floater railway wherein a vehicle mounted on a truck is adapted to float with respect to a train track as the truck moves along the train track, comprising:

a magnetic rail connected to the train track and extending in an advancing direction, said magnetic rail having a bottom surface and a side surface and including a plurality of first magnetic elements having a first magnetic polarity and a plurality of second magnetic elements having a second magnetic polarity opposite to said first magnetic polarity, said first magnetic elements and said second magnetic elements being alternately mounted on said magnetic rail in the advancing direction;

a supporting electromagnet mounted on the truck and positioned to be closely spaced to said bottom surface of said magnetic rail, said supporting electromagnet having a plurality of first poles disposed in the advancing direction and separated by a selected pole pitch; and a guidance electromagnet mounted on the truck and positioned to be closely spaced to said side surface of said magnetic rail, said guidance electromagnet having a plurality of second poles disposed in the advancing direction and separated by said selected pole pitch, each one of said plurality of first poles corresponding to a respective one of said plurality of second poles, each of said first and second corresponding poles having a common magnetic circuit, said plurality of first poles being of one magnetic polarity and said plurality of second poles being of the opposite magnetic polarity, and each one of said corresponding first and second poles being symmetrically disposed relative to said magnetic rail.

2. A floating apparatus according to claim 1, further including:

a second magnetic rail connected to the train track and bilaterally disposed on the train track with respect to said magnetic rail, said second magnetic rail having a bottom surface and a side surface and including a plurality of third magnetic elements alternately mounted on said second magnetic rail with respect to said second magnetic elements in the advancing direction;

a second supporting electromagnet mounted on the truck and positioned to be closely spaced to said bottom surface of said second magnetic rail, said second supporting electromagnet having a plurality of third poles disposed in the advancing direction and separated by said selected pole pitch; and a second guidance electromagnet mounted on the truck and positioned to be closely spaced to said side surface of said second magnetic rail, said second guidance electromagnet having a plurality of fourth poles disposed in the advancing direction and separated by said selected pole pitch, each of said plurality of third poles corresponding to a respective one of said plurality of fourth poles, each of said third and fourth corresponding poles having a common magnetic circuit, said plurality of third poles being of one magnetic polarity and said plurality of fourth poles being of the opposite magnetic polarity, and each one of said corresponding third and fourth poles being symmetrically disposed relative to said second magnetic rail.

3. A floating apparatus according to claim 2, further including means for applying equivalent direct bias currents to said guidance electromagnet and said second guidance electromagnet.

* * * * *